Nov. 20, 1934.  A. W. KIMBELL  1,981,363

METHOD OF MAKING WING NUTS

Filed June 13, 1932

Inventor:
Arthur W. Kimbell,
by Emery, Booth, Varney & Townsend
Attys

Patented Nov. 20, 1934

1,981,363

UNITED STATES PATENT OFFICE 1,981,363

METHOD OF MAKING WING NUTS

Arthur W. Kimbell, Newton Center, Mass., assignor to United-Carr Fastener Corporation, Cambridge, Mass., a corporation of Massachusetts Application June 13, 1932, Serial No. 616,835

3 Claims. (Cl. 10—86)

My invention aims to provide improvements in wing nuts and the method of making the same.

In the drawing which illustrates a preferred embodiment of my invention:—

Figure 4:
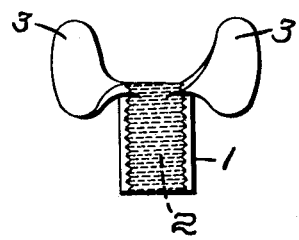
Fig. 4 is a side elevation of a completed wing nut.
Figure 5:
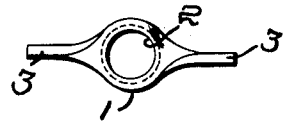
Fig. 5 is a plan view of the completed wing nut.

In the drawing which illustrates a preferred embodiment of my invention, I have shown a simple, inexpensive and efficient wing nut formed from a single piece of sheet metal. The nut when complete, as shown in Figs. 4 and 5, comprises a hollow shank 1 provided with an internal thread 2 for engagement with a cooperating screw shank and a pair of oppositely arranged wings 3—3.

Figure 1:
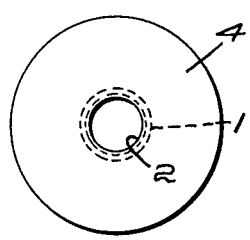
Figure 1 is a plan view of a blank, from which the wing nut is made, showing the integrally threaded hollow shank pressed from the center of the blank.
Figure 2:
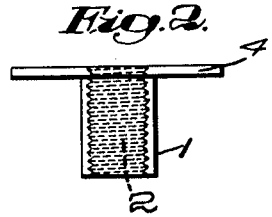
Fig. 2 is a side elevation of the device shown in Figure 1.
Figure 3:
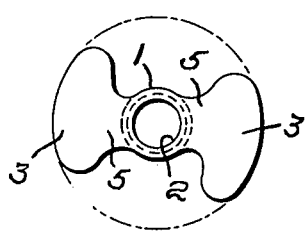
Fig. 3 is a view of the device shown in Figure 1, but with portions of the blank cut away to form the wings.

My preferred method of forming the one-piece sheet metal wing nut is to blank out a circular disk 4 and press out the center portion to provide the shank 1, as best illustrated in Figs. 1 and 2. Thereafter the shank is threaded. The wings 3—3 are then formed by cutting away portions of the blank 4, thereby leaving the portions which provide the wings, as best illustrated in Fig. 3. These wing portions are twisted at the portions 5—5 so that the wings may assume positions at opposite sides of the shank 1 (Figs. 4 and 5) in a plane at substantially a right angle to the original plane of the blank.

The ultimate wing nut has the wing portions 3—3 extending from one end of the shank 1 and which is of a single thickness of metal stiffened by the twisted portions 5—5 and providing convenient means to be grasped by the fingers of the operator so that the nut may be easily rotated when being engaged with or disengaged from a cooperating screw shank.

While I have illustrated and described a preferred embodiment of my invention, I do not wish to be limited thereby, because the scope of my invention is best defined by the following claims.

I claim:

1. The method of making a wing nut which comprises pressing out the center portion of a sheet metal blank to form a shank, cutting the remainder of said blank to form wing portions, twisting said wing portions from a plane transverse to the axis of the shank to a plane parallel relative to the axis of the shank and threading the shank at any time after it has been formed.

2. The method of making a wing nut which comprises pressing out the center portion of a sheet metal blank to form an elongated tubular shank and a surrounding annular flange, cutting the flange portion of the blank to form wing portions, twisting said wing portions from a plane transverse to the axis of the shank to a plane parallel relative to the axis of the shank and threading the interior of the tubular shank at any time after it has been formed.

3. The method of making a wing nut which comprises pressing out the center portion of a sheet metal blank to form an elongated tubular shank and a surrounding annular flange, cutting the flange portion of the blank to form wing portions, twisting said wing portions from a plane transverse to the axis of the shank to a plane parallel relative to the axis of the shank and away from the shank, and threading the interior of the tubular shank at any time after it has been formed.

ARTHUR W. KIMBELL.